Feb. 15, 1949.   R. J. ANSCHICKS ET AL   2,461,673
MULTIPLE LENS LIGHT CONTROL FOR PROJECTORS
Filed Oct. 3, 1947   3 Sheets-Sheet 2
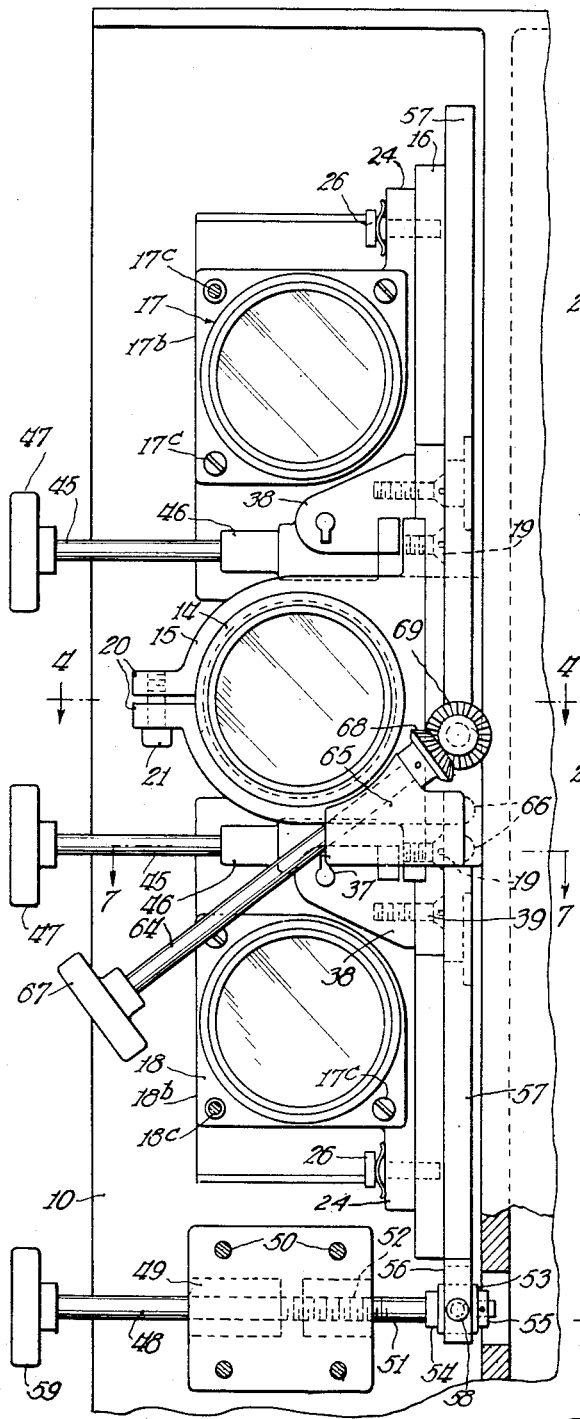
Inventors:
Rudolph J. Anschicks
Charles Widell and
John R. Mantsh Feb. 15, 1949.  R. J. ANSCHICKS ET AL  2,461,673
MULTIPLE LENS LIGHT CONTROL FOR PROJECTORS
Filed Oct. 3, 1947  3 Sheets-Sheet 3
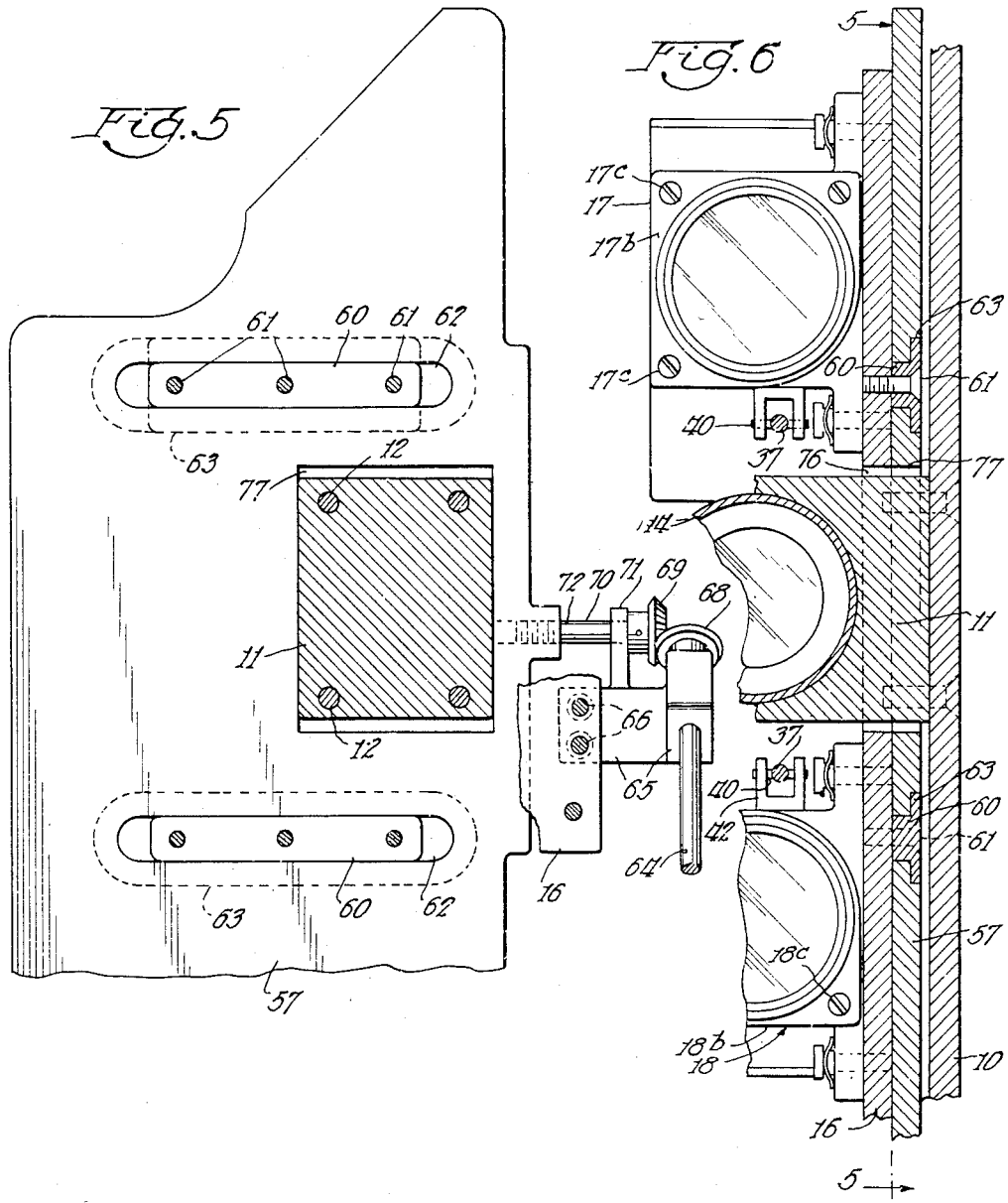
Inventors:
Rudolph J. Anschicks
Charles Widell and
John R. Mantsh Patented Feb. 15, 1949

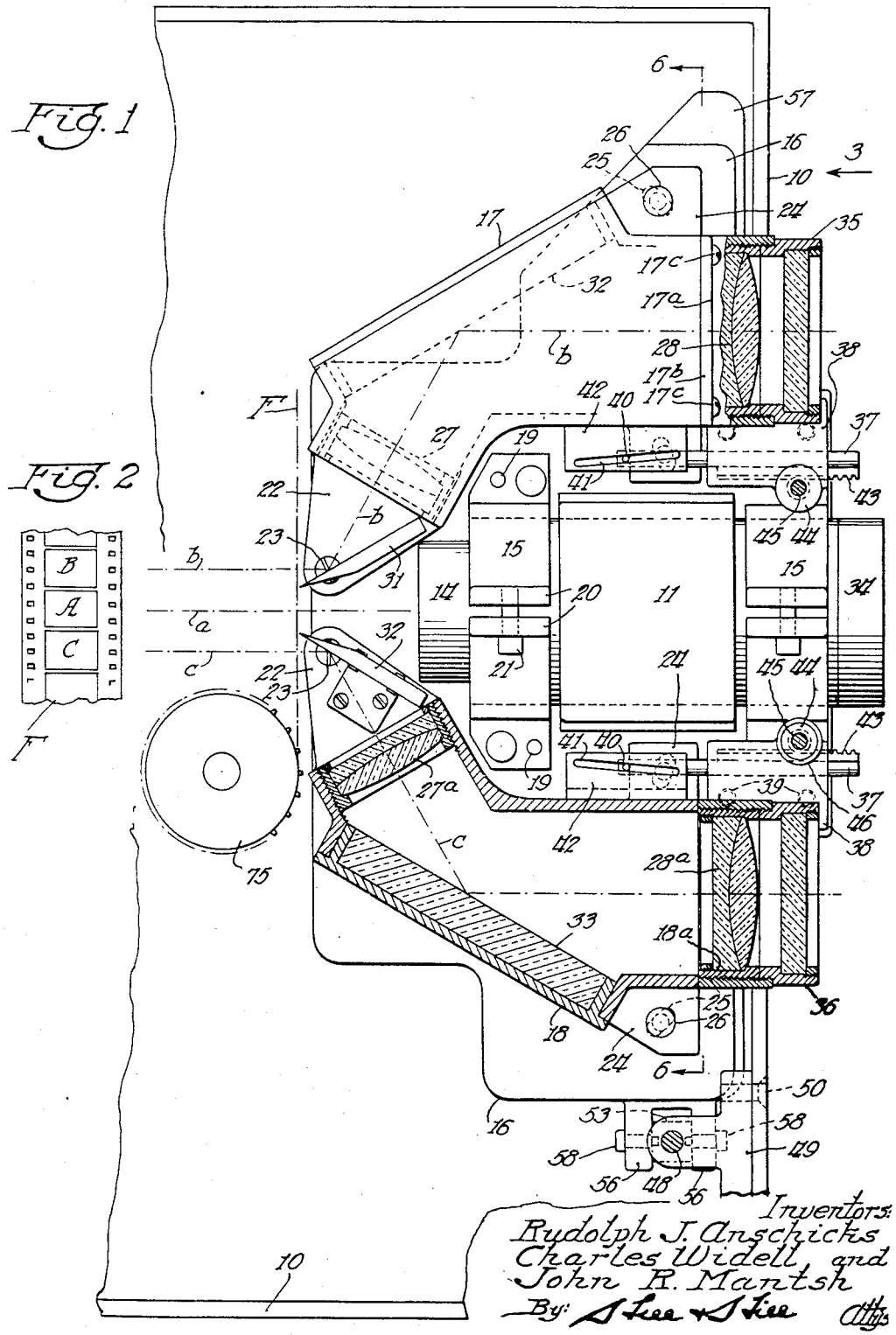

2,461,673

SEARCH ROOM

UNITED STATES PATENT OFFICE 2,461,673

MULTIPLE LENS LIGHT CONTROL FOR PROJECTORS

Rudolph J. Anschicks, Charles Widell, and John R. Mantsh, Chicago, Ill., assignors to Prismacolor, Inc., Chicago, Ill., a corporation of Illinois Application October 3, 1947, Serial No. 777,710

15 Claims. (Cl. 88—1)

1

This invention relates to a light control for projectors for projecting a plurality of images or color cut-outs of the same photographed objects impressed upon a film, or other transparency.

In three colored picture projection, the object or objects are first photographed on a sensitized film in groups of three juxtaposed "frames" and color filters, preferably green, blue or red are employed in the camera, one for each frame of the group. After the film has been developed positive films may be reproduced therefrom, and projected upon a screen by a suitable projector.

As is well known to those familiar with the art, the individual images, or color cut-outs of the same photographed objects provided by the film or other transparency are projected upon a screen by an assembly of juxtaposed lenses, the individual lenses being positioned in the path of light rays passing through the respective images, or color cut-outs and focused upon a screen in superimposed relation. In lens assemblies comprising a middle and two outer juxtaposed lenses in three color projection, the focal planes of the images are brought into coincidence with the projection screen by advancing or retracting the lenses together as a unit, and in accordance with the present invention the exact superimposition of the various images can be accomplished by moving the outer lenses toward, or away from, the middle lens and by moving the outer lenses horizontally in a direction transverse of themselves.

One of the objects of the present invention is to provide a light control for projectors wherein the light rays projected through one frame is projected directly through a middle lens and the light rays projected through the other two frames are reflected by mirrors, or other plates having reflecting surfaces thereon, through lenses to second mirrors, or plates having a reflecting surface thereon and by the second mirror reflected through the other lens of the same lens group to the screen.

Another object is to provide novel means for moving the outer lenses toward and away from the middle lens, whereby to accurately vertically superimpose the three images upon each other on the screen.

Another object is the provision of means for moving the outer lenses horizontally in transverse directions so as to superimpose the projected images upon each other in a horizontal direction.

Another object is to provide means for adjusting the several lenses together toward, or away

2 from the film, whereby to focus the device upon the screen.

Many other objects and advantages will appear in the course of this specification and with all of said objects and advantages in view this invention consists in the several novel features of construction, arrangement and combination of parts hereinafter fully described and more definitely pointed out in the appended claims.

The invention is clearly illustrated in the drawings accompanying this specification in which:

Fig. 1 is a view partly in side elevation and partly in vertical longitudinal section through a light control for projectors mounted upon a fragment of a projector and illustrating a simple embodiment of the invention;

Fig. 2 is a fragmental side elevation of a film strip used in the projector;

Fig. 3 is an end elevation of the light control looking in the direction of the arrow 3 in Fig. 1;

Fig. 4 is a horizontal section taken on the line 4—4 of Fig. 3;

Fig. 5 is a view partly in side elevation and partly in vertical cross section taken on the line 5—5 of Fig. 6;

Fig. 6 is a vertical cross section taken on the line 6—6 of Fig. 1; and

Fig. 7 is a horizontal section taken on the line 7—7 of Fig. 3.

Referring to said drawings, which are merely illustrative of one embodiment of the invention, the reference character 10 designates an upright supporting member, which may comprise the frame of the projector (not shown) with which the light control is used.

Rigidly secured to said supporting member is a supporting block 11, which may be secured thereto as by screws, or the like 12. The supporting block is formed with a horizontally extending bore 13 and in said bore is held the middle cylindrical lens housing 14, the end portions of which extend beyond the supporting block. Supported from said lens housing as by clamp blocks 15 is an upright supporting plate 16 preferably of an irregular outline, as indicated in Fig. 1 and said supporting plate 16 forms the support for the various upper and lower lens housings 17, 18. The plate 16 also carries a plate 57, the purpose of which will be explained later. The supporting block 11 extends through holes 76, 77 formed respectively in the plates 16, 57. The clamp blocks 15 are secured to the supporting plate 16 as by screws 19 (see Fig. 3), and each clamp block is split and from the split portion extend ears 20 which are connected by a clamp bolt 21 extending through said ears and threadedly engaged in one of them. The clamp blocks are clamped upon the ends of the lens housing 14 which extend beyond the supporting block 11.

The upper and lower lens housings 17, 18 are pivotally mounted upon the supporting plate 16, whereby they may be swung toward, or away from, the middle lens housing in order to accurately vertically superimpose the images projected through said upper and lower lens housings upon the screen and to superimpose them upon the image projected through the middle lens housing. As shown the upper and lower lens housings are formed with lugs 22 at one of their ends, pivotally mounted upon the supporting plate 16 as by screws 23 or their equivalent. The upper and lower lens housings lie flush with the supporting plate 16 and at their ends opposite the pivoted ends they are formed with ears 24 having arcuate slots 25 formed therein through which screws 26 extend and are threadedly mounted in the supporting plate 16. The upper and lower lens housings are held in close contact with the supporting plate 16, by the screws 23, 26.

Within the several lens housings are mounted lenses 27, 28, 27a, 28a and 29, 30 which may be supported therein in any desirable manner. Suitably supported upon each lug 22 is a mirror 31 or 32, or other plate having a reflecting surface, which mirror is disposed at an angle of 30° to the optical axis of its associated lens 27 or 27a and mounted within each lens housing 17, 18 is a mirror 32, 33 or other plate having a reflecting surface, which mirror is disposed at an angle of 30° with respect to the optical lens axes of the lenses 27, 28 and 27a, 28a. The optical axes of the lenses 27, 28 and 27a, 28a are disposed at angles of 120° to each other and the lens housings 17, 18 each has an angle shaped passage therethrough in which the angle is also 120°.

In the ends of the lens housings containing the lenses 28, 28a, are secured color filters 34, 35, 36 (see Fig. 1).

A fragment of a film F is shown in Figs. 1 and 2, in which the frames are arranged in groups indicated by B, C, A, through which the light rays are simultaneously projected to display a multi-color picture on the screen.

In Fig. 1, the reference characters a, b, c, indicate rays of light passing through the frames B, C, A, of the film F, or other transparency, the ray of light a, passing directly through the middle lenses and color filter to the screen. The ray b, strikes the mirror 31 and is reflected through the lens 27 to the mirror 32 and by it is reflected through the lens 28 and color filter 35 to the screen. In the same manner the ray of light c, is reflected by the mirror 32 through the lens 27a to the mirror 33 and by it reflected through the lens 28a and the color filter 36 to the screen.

In order to accurately vertically superimpose the images projected through the outer lens housings 17, 18 upon the image projected through the lens housing 14, means are provided for swinging the lens housings 17, 18 upon their pivots 23 toward or away from the middle lens housing. As shown, said means comprises a stem 37, one for each lens housing 17, 18 slidably mounted in a block 38 mounted on the plate 16 as by screws 39. To one end of each stem is secured a pin 40 which extends through a slot 41 formed in a trough-like cam member 42 secured to an associated lens housing 17 or 18.

Longitudinal movement of the stem 37 in one direction causes the pin 40 to move the associated cam member 42 and therewith the associated outer lens housing toward the middle lens housing and longitudinal movement of the stem in the opposite direction causes the pin to move the associated outer lens housing away from the middle lens housing.

Each stem 37, is shown as provided with a rack bar 43 which meshes with a pinion 44 formed upon a spindle 45 rotatably mounted in a bearing block 46 which may be formed integrally with the block 38. Upon the free end of the spindle 45 is secured a knob 47, or hand wheel, by means of which the spindle may be rotated.

With the means just described the outer lens housings may be accurately adjusted in a vertical direction so as to precisely superimpose the images projected through said outer lens housings upon the image projected through the middle lens housing at the screen.

Sometimes it becomes necessary to adjust the outer lens mountings horizontally in a transverse direction in order to accurately superimpose the images upon the screen. In the means shown for accomplishing this result the supporting plate 16 and all of the parts carried thereby, may be partially rotated about the middle lens mounting as an axis. The means shown for partially rotating the supporting plate 16 and the outer lens housings about the axis of the middle lens housing comprises a spindle 48 (see Fig. 3) journaled in a bearing block 49 mounted upon the supporting member 10 as by screws 50 and said spindle is provided with screw threads 51 threadedly engaged in the member 52 of the bearing block 59. To permit relative angular movement between the spindle 48 and the plate 57, one end of the spindle 48 is connected to a block 53 by collars 54, 55, secured to the spindle and said block 53 is pivotally connected to lugs 56 (see also Fig. 1) formed on the plate 57 by pins 58 threadedly mounted in said lugs and engaging in a groove in the block 53. On the other end of the spindle is secured a knob, or hand wheel 59 by means of which the spindle 48 may be rotated. Rotation of the spindle in the member 52 of the bearing block 49 will cause endwise movement of the spindle in either direction depending upon the direction in which the spindle is rotated and the endwise movement of the spindle causes the plate 57 to be partially rotated about the axis of the middle lens housing.

The plate 16 is slidably connected with the plate 57 by horizontal guide bars 60 (see Fig. 5) secured to the supporting plate 16 as by screws 61 and sliding in slots 62 formed in the plate 57. Secured to each guide bar 60 as by the screws 61 is a plate 63 which slides in a guide way formed in one face of the plate 57. The screws 61 and plates 63 serve to hold the plate 57 in close contact with the supporting plate 16.

From the above it is apparent that when the spindle 48 is rotated the plate 57 and therewith the plate 16 and the outer lens housings and other parts carried thereby will be partially rotated about the axis of the middle lens, whereby the images projected through the lenses of the outer lens housings may be accurately superimposed in horizontal directions upon each other and upon the images projected through the middle lenses.

In focusing the light control upon the screen it may be necessary to simultaneously adjust the several lenses toward or away from the film or other transparency F. The means illustrated for accomplishing this result comprises a spindle 64 (see Fig. 3), rotatably mounted in a bearing block 65 secured upon the plate 16 as by screws or the like 66. Upon one end of the spindle 64 is a knob or hand wheel 67 by means of which may be rotated and upon the other end of the spindle 64 is a mitre gear wheel 68 which meshes with a mitre gear wheel 69 pinned or otherwise secured to a shaft 70 (see also Fig. 5), rotatably mounted in a lug 71 formed as a part of the bearing block 65. The end of the shaft 70 opposite the mitre gear wheel 69 is screw threaded as at 72 and the screw threaded end of the shaft is threadedly engaged with the plate 57.

Whenever the spindle 64 is rotated the shaft 70 is rotated through the mitre gear wheels 68, 69, and by reason of the threaded engagement of the shaft with the plate 57 (which is held against movement in a horizontal direction in its own plane), the shaft 70 is moved in an endwise direction depending upon the direction in which the spindle 64 is rotated. The endwise movement of the shaft 70 is imparted to the bearing block 65 through the mitre gear wheels 68, 69 and the plate 16 being secured to the bearing block 65, it is moved in a horizontal direction in its own plane thereby moving the several lens housings toward or away from the film depending upon the direction in which the spindle 64 is rotated. The middle lens housing may be adjusted forwards or backwards by backing off the screws 21 slightly so as to loosen the clamp blocks 15 upon the lens housing 14.

Sometimes the optical centres of the lenses 28, 28a do not coincide with the mechanical centres thereof, and in order to correct this defect, the lens housings 17, 18 may include lens holders 17a, 18a in which the lenses are held. The lens holders may be cylindrical and may be formed with flanges 17b, 18b fastened to the end faces of the main lens housings 17, 18 by screws 17c, 18c threaded in the lens housings and extending through over-size holes in the flanges (see Fig. 3). By backing off the screws 17c, 18c slightly the lens holder may be shifted about on the end face of the main portion of the lens housing, the lens holder may be shifted about until the optical centre of the lens thereof has been brought into coincidence with the optical axis. This can be determined by projecting a picture upon a screen. When the lens holders are employed the color screens may be secured therein as shown.

Inasmuch as the projector with which the light control is used forms no part of the present invention, no part of which is illustrated except a fragment of its frame 10 and a film driving sprocket 75 which is intermittently rotated as is well known by those familiar with the art.

In the operation of the light control, the light rays which project the red portion of the image on the screen pass directly through the middle lenses; the light rays which project the green portion of the image upon the screen pass through the outer lens housing 17 to the screen and the light rays which project the red portion of the image upon the screen pass through the outer lens housing 18 to the screen.

The light control for projectors may be used with an animated picture projector, or with a still life projector.

Having thus described our invention, it is obvious that various immaterial modifications may be made in the same without departing from the spirit of our invention; hence, we do not wish to be understood as limiting ourselves to the exact form, construction, arrangement and combination of parts herein shown and described or uses mentioned.

What we claim as new and desire to secure by letters patent is:

1. In light control for projectors, the combination of a main supporting block having a bore therethrough, a cylindrical middle lens housing extending through said bore, a supporting plate carried by said lens housing, outer lens housings pivotally mounted on said plate, one at each side of the middle lens housing and swingable toward and from said middle lens housing, lenses in said middle lens housing, angularly disposed lenses in said outer lens housings, a plate carried by each outer lens housing and having a reflecting surface, each plate being disposed at an angle to the optical axis of one of the lenses in each outer lens housing, a second plate in each outer lens housing having a reflecting surface and disposed at an angle to the optical axes of both lenses in the outer lens housings, and means to swing said outer lens housings toward and away from the middle lens housing.

2. In light control for projectors, the combination of a main supporting block having a bore therethrough, a cylindrical middle lens housing extending through said bore, a supporting plate carried by said lens housing, outer lens housings having lugs formed thereon, means to pivotally mount said lugs on said plate, there being one outer lens housing on each side of the middle lens housing and swingable toward and from said middle lens housing, lenses in said middle lens housing, angularly disposed lenses in said outer lens housings, a plate carried by each outer lens housing and having a reflecting surface, each plate being disposed at an angle to the optical axis of one of the lenses in each outer lens housing, a second plate in each outer lens housing having a reflecting surface and disposed at an angle to the optical axes of both lenses in the outer lens housings, and means to swing said outer lens housings toward and away from the middle lens housing.

3. In light control for projectors, the combination of a main supporting block having a bore therethrough, a cylindrical middle lens housing extending through said bore, a supporting plate carried by said lens housing, outer lens housings pivotally mounted on said plate one at each side of the middle lens housing and swingable toward and from said middle lens housing, lenses in said middle lens housing, angularly disposed lenses in said outer lens housings, a plate carried by each outer lens housing and having a reflecting surface, each plate being disposed at an angle to the optical axis of one of the lenses in each outer lens housing, a second plate in each outer lens housing having a reflecting surface and disposed at an angle to the optical axes of both lenses in the outer lens housings, and means to swing said outer lens housings toward and away from the middle lens housing, comprising slotted cam members one for each lens housing and secured thereto, the slots extending at an inclined angle with respect to the optical axis of one of the lenses in the outer lens housing and a slidably mounted stem having a pin at one end engaging in the slots.

4. In light control for projectors, the combination of a main supporting block having a bore therethrough, a cylindrical middle lens housing extending through said bore, a supporting plate carried by said lens housing, outer lens housings pivotally mounted on said plate one at each side of the middle lens housing and swingable toward and from said middle lens housing, said outer lens housings being flush with said plate and there being ears formed on the outer lens housings connected to the plate by screws, lenses in said middle lens housing, angularly disposed lenses in said outer lens housings, a plate carried by each outer lens housing and having a reflecting surface each plate being disposed at an angle to the optical axis of one of the lenses in each outer lens housing, a second plate in each outer lens housing having a reflecting surface and disposed at an angle to the optical axes of both lenses in the outer lens housings, and means to swing said outer lens housings toward and away from the middle lens housing, comprising slotted cam members one for each lens housing and secured thereto, the slots extending at an inclined angle with respect to the optical axis of one of the lenses in the outer lens housing and a slidably mounted stem having a pin at one end engaging in the slots.

5. In light control for projectors, the combination of a main supporting block having a bore therethrough, a cylindrical middle lens housing extending through said bore, a supporting plate carried by said lens housing, outer lens housings pivotally mounted on said plate one at each side of the middle lens housing and swingable toward and from said middle lens housing, lenses in said middle lens housing, angularly disposed lenses in said outer lens housings, a plate carried by each outer lens housing and having a reflecting surface, each plate being disposed at an angle to the optical axis of one of the lenses in each outer lens housing, a second plate in each outer lens housing having a reflecting surface and disposed at an angle to the optical axes of both lenses in the outer lens housings, and means to swing said outer lens housings toward and away from the middle lens housing, comprising slotted cam members one for each lens housing and secured thereto, the slots extending at an inclined angle with respect to the optical axis of one of the lenses in the outer lens housing and a slidably mounted stem having a pin at one end engaging in the slots, each stem having a rack bar thereon, a pinion meshing with said rack bar, a spindle carrying said pinion, a hand wheel on said spindle and a bearing block in which the stem is slidably mounted and the spindle is rotatably journaled.

6. In light control for projectors, the combination of a main supporting block a bore therethrough, a cylindrical middle lens housing extending through said bore, a supporting plate carried by said lens housing, outer lens housings pivotally mounted on said plate one at each side of the middle lens housing and swingable toward and from said middle lens housing, there being a lug projecting from each housing pivotally connected to said plate, lenses in said middle lens housing, angularly disposed lenses in said outer lens housings, a plate carried by the lug of each outer lens housing and having a reflecting surface, each plate being disposed at an angle to the optical axis of one of the lenses in each outer lens housing, a second plate in each outer lens housing having a reflecting surface and disposed at an angle to the optical axes of both lenses in the outer lens housings, and means to swing said outer lens housings toward and away from the middle lens housing, comprising slotted cam members one for each lens housing and secured thereto, the slots extending at an inclined angle with respect to the optical axis of one of the lenses in the outer lens housing and a slidably mounted stem having a pin at one end engaging in the slot, each stem having a rack bar thereon, a pinion meshing with said rack bar, a spindle carrying said pinion, a hand wheel on said spindle and a bearing block in which the stem is slidably mounted and the spindle is rotatably journaled.

7. In a light control for projectors, the combination of a stationarily mounted supporting block having a bore therethrough, a middle lens housing extending through the bore of said block, a supporting plate carried by said lens housing, outer lens housings mounted on said plate and means for partially rotating said plate and therewith the outer lens housings about the axis of the middle lens housing.

8. In a light control for projectors, the combination of a stationarily mounted supporting block having a bore therethrough, a middle cylindrical lens housing extending through the bore of said block, a supporting plate carried by said lens housing, outer lens housings pivotally mounted on said plate and means for partially rotating said plate and therewith the outer lens housings about the axis of the middle lens housing.

9. In a light control for projectors, the combination of a stationarily mounted supporting block having a bore therethrough, a middle cylindrical lens housing extending through the bore of said block, a supporting plate carried by said lens housing, outer lens housings mounted on said plate and means for partially rotating said plate and therewith the outer lens housings about the axis of the middle lens housing, comprising a spindle extending approximately at right angles to said plate and connected at one end to said plate and having a knob on its other end and a stationarily mounted bearing block in which said spindle is rotatably mounted, said spindle having a threaded engagement with said bearing block.

10. In a light control for projectors, the combination of a stationarily mounted supporting block having a bore therethrough, a middle cylindrical lens housing extending through the bore of said block, a supporting plate carried by said lens housing, outer lens housings pivotally mounted on said plate and means for partially rotating said plate and therewith the outer lens housings about the axis of the middle lens housing, comprising a second plate held against movement in a horizontal direction in its own plane, a spindle extending approximately at right angles to said second named plate and connected at one end to said second named plate and having a knob on its other end, and a stationarily mounted bearing block in which said spindle is rotatably mounted, said spindle having a threaded engagement with said bearing block.

11. In a light control for projectors, the combination of a stationarily mounted supporting block having a bore therethrough, a middle cylindrical lens housing extending through the bore of said block, and projecting beyond the ends of said block, a supporting plate, clamp blocks carried by said supporting plate, encircling and clamped upon the projecting ends of the middle lens housing, outer lens housings mounted on said plate and means for partially rotating said plate and therewith the outer lens housings about the axis of said middle lens housing.

12. In a light control for projectors, the combination of a stationarily mounted supporting block having a bore therethrough, a middle cylindrical lens housing extending through the bore of said block, and projecting beyond the ends of said block, a supporting plate, split clamp blocks carried by said supporting plate and encircling the projecting ends of the middle lens housing, bolts for clamping the clamp blocks on the middle lens housing, outer lens housings mounted on said plate and means for partially rotating said plate and therewith the outer lens housings about the axis of said middle lens housing.

13. In a light control for projectors, the combination of a stationarily mounted supporting block having a bore therethrough, a cylindrical middle lens housing extending through said bore, a supporting plate carried by said lens housing, outer lens housings mounted on said plate, a second plate held against movement in a horizontal dircetion through its own plane, said first named plate being guided upon said second named plate for movement in a horizontal direction and means for moving said first named plate along said second named plate horizontally in its own plane.

14. In a light control for projectors, the combination of a stationarily mounted supporting block having a bore therethrough, a cylindrical middle lens housing extending through said bore, a supporting plate carried by said lens housing, outer lens housings mounted on said plate, a second plate held against movement in a horizontal direction through its own plane, said first named plate being guided upon said second named plate for movement in a horizontal direction and means for moving said first named plate along said second named plate horizontally in its own plane, comprising a shaft threadedly engaged with said second named plate along an axis parallel therewith, a spindle, a bearing block therefor mounted on said first named plate, intermeshing mitre gear wheels mounted respectively on said shaft and spindle and a knob on the free end of the spindle.

15. In a light control for projectors, the combination of a stationarily mounted block having a bore therethrough, a middle lens housing extending through said bore, a supporting plate carried by said lens housing, outer lens housings mounted on said plate, a second named plate held against movement in a horizontal direction through its own plane, guide bars secured to said first named plate and extending in slots in the second named plate and means for moving said first named plate along said second named plate horizontally in its own plane.

RUDOLPH J. ANSCHICKS.
CHARLES WIDELL.
JOHN R. MANTSH.

REFERENCES CITED

The following references are of record in the file of this patent:

UNITED STATES PATENTS

| Number | Name | Date |
|---|---|---|
| 973,962 | Oliver | Oct. 25, 1910 |
| 1,269,391 | Cooper | June 11, 1918 |
| 1,773,575 | Dina | Aug. 19, 1930 |
| 1,793,698 | Jones | Feb. 24, 1931 |
| 1,861,496 | Guggenheim | June 7, 1932 |
| 1,981,690 | Napoli et al | Nov. 20, 1934 |
| 2,016,034 | Concord | Oct. 1, 1935 |
| 2,109,596 | Plahn | Mar. 1, 1938 |
| 2,219,224 | French | Oct. 22, 1940 |